United States Patent Office 3,654,119
Patented Apr. 4, 1972

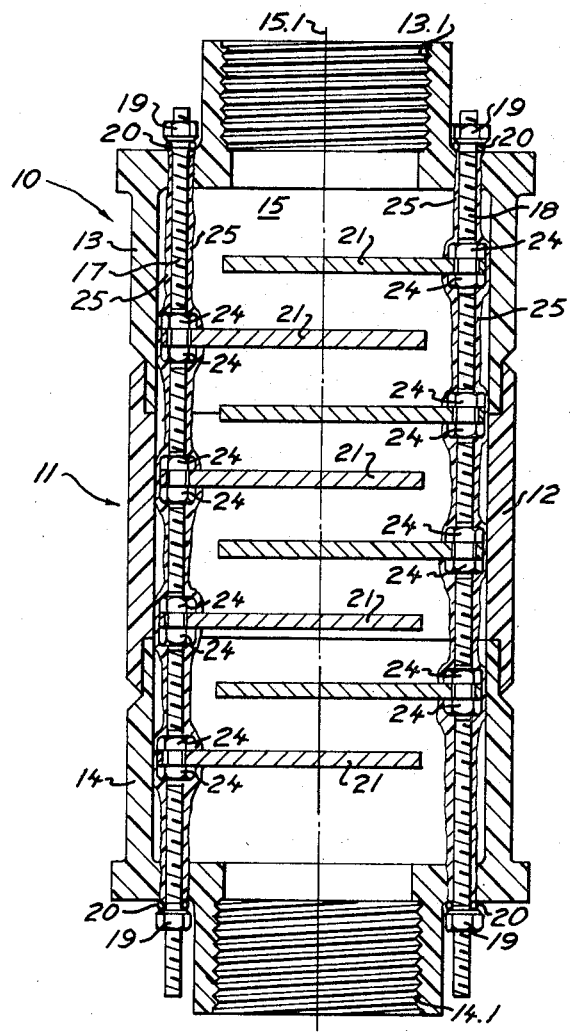
Fig. 1
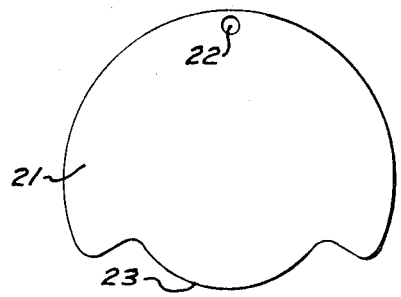
Fig. 2
Gordon F. White and
Adam R. Wilkinson,
Inventors
by 
Lyle G. Trorey,
Agent

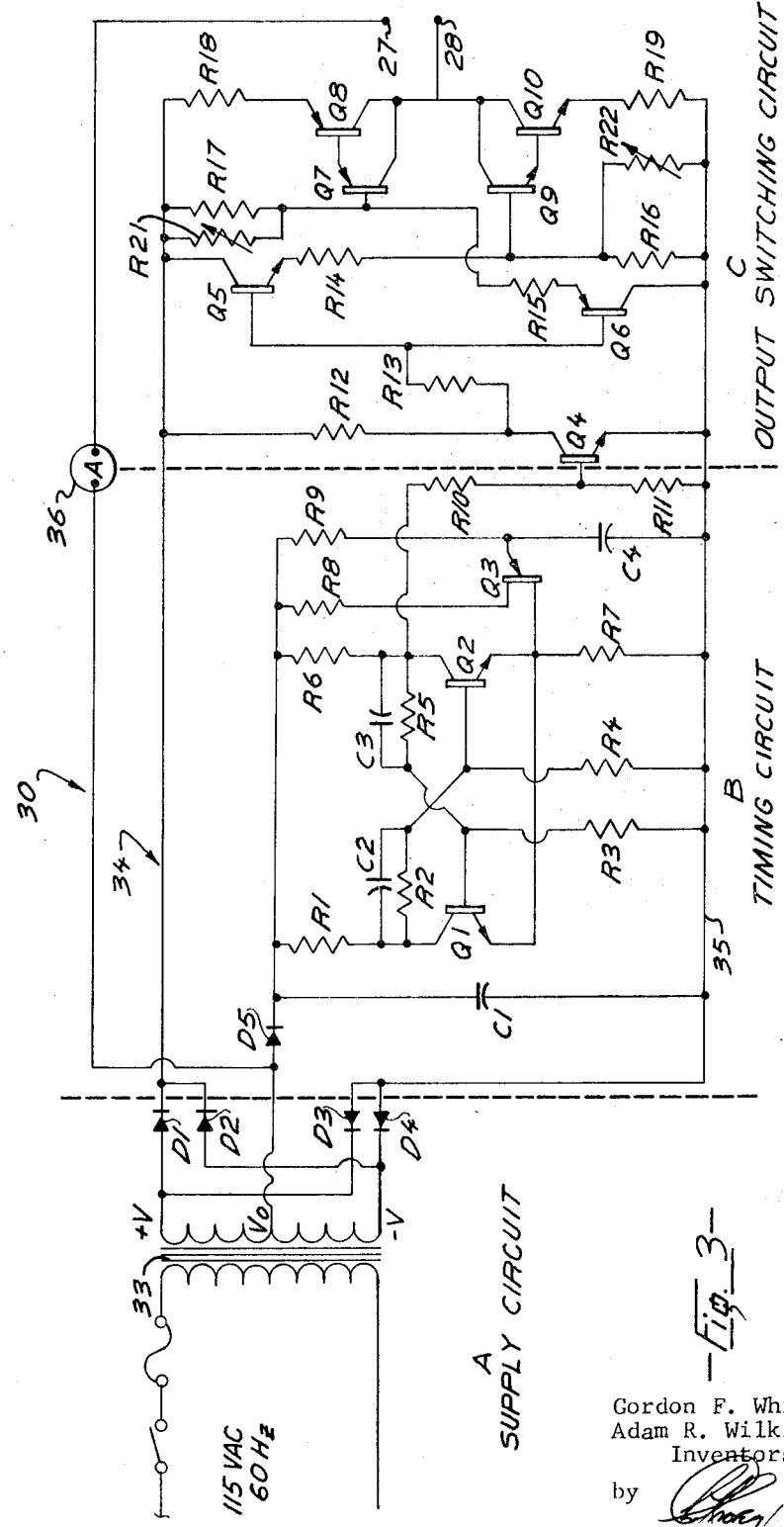

3,654,119
OLIGODYNAMIC TREATMENT OF LIQUIDS
Gordon F. White, Vancouver, and Adam R. Wilkinson, Burnaby, British Columbia, Canada, assignors to White Water International Ltd., Vancouver, British Columbia, Canada
Filed Oct. 12, 1970, Ser. No. 79,987
Int. Cl. B01k 3/00, 1/00
U.S. Cl. 204—228                                               4 Claims

ABSTRACT OF THE DISCLOSURE

Oligodynamic treatment wherein the liquids are passed over electrodes each of which is an alloy of copper and silver. The electrodes are opposite poles of an electrical circuit having means for changing polarity of the electrodes at predetermined intervals.

BACKGROUND OF THE INVENTION

Field of the invention

This invention is related to oligodynamic treatment of liquids such as drinking water and swimming pool water.

Prior art

Bactericidal and algaecidal effects of certain metals have been known for many years. Many centuries ago King Cyrus carried with him, in his campaigns water, from the River Choaspes, the water being stored in silver jugs to maintain purity.

In recent years apparatus has been devised and used to treat liquids oligodynamically wherein active metals are released into liquids by an electric current passing through the liquid between electrodes, at least one of the electrodes being an oligodynamically active metal.

It has been found that oligodynamic treatment of liquids, particularly water, is superior to treatment by methods such as chlorination, or by methods using ultra-violet rays. Chlorinated water, besides having an odor and taste, irritates eyes and nasal membranes. Further, residual effect of chlorine in water is not long lasting. Treatment of water by ultra-violet rays is instantaneously effective, however there is no residual effect.

On the other hand oligodynamic active metals, particularly silver and copper in sufficient concentration to have valued bactericidal and algaecidal effects, are not toxic. They do not impart a discernable taste to the water, neither do they cause irritation. Furthermore they have a relatively long residual effect.

Oligodynamic treatment of prior art have apparatus using current reversal mechanisms to alter electrode polarity at frequent intervals—so to enable liquids washing over the electrodes to clear the latter of bubbles of hydrogen and oxygen, and of other deposits which impair their effectiveness.

Prior art apparatus has not, in the main been entirely successful in the applications, such as in sterilizing household drinking water or maintaining private swimming pools in acceptable condition. Silver enters water very rapidly under the action of an electric current, and consequently in apparatus employing silver plates they must frequently be replaced, resulting in high cost of operation. Furthermore, polarity change devices have usually been of a mechanical nature and are, therefore, subject to wear and frequent breakdown.

SUMMARY OF THE INVENTION

The present invention provides apparatus for oligodynamic treatment of liquids, particularly drinking water and water in swimming pools, the apparatus relatively inexpensive to install, has a relatively long operational life, and uses electronic polarity changing means so as to reduce materially, likelihood of breakdown. The present apparatus is, consequently, well adapted for use by an average householder whose finances and skills are generally limited.

In the apparatus of the present invention electrodes used are an alloy of copper and silver—silver for its bactericidal effect and copper for its algaecidal effect. The use of copper in the alloy retards the emission of silver into the liquid treated in concentrations known to have good bactericidal and algaecidal effects.

The apparatus of the present invention includes; a casing having a long chamber; a pair of conductors extending longitudinally of the chamber and adapted to be connected as opposite poles in an electrical circuit and a plurality of plate electrodes each being an alloy of copper and silver connected to the conductor. The conductors are insulated to prevent erosion.

The apparatus also includes a polarity changing device for altering polarity of the electrode plates at predetermined intervals and includes a bistable multi-vibrator having transistors triggered by a unijunction transistor relaxation oscillator which controls ON–OFF conduction of a transistor, the latter alternating ON–OFF condition of a pair of bias drivers. The bias drivers in turn control alternate ON–OFF condition of a pair of transistors one of which controls flow of positive voltage current from a DC source and the other of which controls flow of negative voltage current from the DC source.

DESCRIPTION OF THE DRAWINGS

FIG. 1 is a longitudinal section of a portion of the apparatus showing a casing and electrodes therein,
FIG. 2 is a plan of an electrode plate,
FIG. 3 is a schematic of a polarity changing device.

A detailed description following, related to the drawings, gives exemplification of apparatus according to the invention which, however, is capable of expression in means other than those particularly described and illustrated.

DETAILED DESCRIPTION

FIGS 1 and 2.—Liquid sterilizing apparatus, generally 10, as seen in FIG. 1 includes a cylindrical casing 11 having a central cylindrical portion 12 and end portions 13 and 14. The portions when fitted together as seen in FIG. 1 provide a long cylindrical sterilizing chamber 15 having an axis 15.1.

The end portions 13 and 14 are each internally threaded as seen at 13.1 and 14.1 to enable the casing to be connected in a line carrying household water, or in a water circulating line for a swimming pool. The end and central portions of the casing are made of a dielectric material—a thermoplastic material such as PVC being acceptable.

The portions of the casing are pressed together in tight liquid sealed engagement by means of a pair of threaded brass rods 17 and 18 which extend through and longitudinally of the chamber and through the end portions 13 and 14. Nuts 19 and annulus sealing rings 20 are fitted over extending ends of the rod. The nuts 19 are tightened against the end portions 13 and 14 of the casing until the latter is proof against leakage under pressure of the liquid to be passed through the chamber.

A plurality of electrode plates 21, FIG. 2, each being an alloy of about eighty percent copper and twenty percent silver by weight, are mounted on the rods 17 and 18. The plates are all of the same size and, as shown in FIG. 1, have a sliding fit in the chamber being disposed normal to the axis 15.1. Referring to FIG. 2, each plate has a hole 22 adjacent its periphery for a rod and each has a peripheral indentation 23 diametrically opposite the holes 22, the indentations providing openings for passage of the liquid.

As seen in FIG. 1 the plates are disposed in spaced apart relationship on the rods and are maintained in position by keeper nuts 24 threaded on the rods, the nuts bearing on opposite sides of the plates. Each of the plates 21 s connected to the rod 17 extends between and is spaced from a pair of adjacent plates connected to the rod 18. As the indentation 23 of adjacent plates are in staggered relationship, liquid flowing through the chamber 15 follows a zig-zag course. Both sides of each plate are consequently, washed by the liquid and, is agitated as it passes through the chamber.

In order to inhibit consumption of the rods 17 and 18 during operation of the apparatus, and in order to maintain a sound connection between the rods and the electrode plates, a water proof insulating coating 25 is applied to the rods and the keeper nuts 24. The coating 25 can be a suitable thermoplastic such as PVC and can be applied by dipping the rods with the electrode plates secured thereto into the thermoplastic material in a liquid condition. Only the surfaces of the electrode plates are exposed to liquids passing through the chamber.

Proportion of the silver and copper forming the electrode plates is based on standards of permissible concentration of both metals in drinking water adopted by the Department of National Health and Welfare, Canada and the National Technical Advisory Committee on Water Quality Criteria to the Secretary of the Interior, United States of America. Both of these bodies have established maximum permissible limits of 0.05 p.p.m. silver and 1.0 p.p.m. copper in drinking water—water having a copper concentration above 1.0 p.p.m. having a discernible copper taste.

Rate of emission of both metals into water is proportionate to their proportions in alloy. Consequently, water treated using plates in which the ratio of copper to silver is less than twenty to one would not have a copper taste if the silver concentration is maintained below the permissible limits as above, provided the water, initially, contained no copper. In the plates 21 ratio of copper to silver is four to one, as as to provide a safety factor should the water to be treated, initially, have copper or copper salts in solution.

FIGS. 1 and 3.—An electric current is supplied to the plates 21 by connection of rods 17 and 18 to output poles 27 and 28 of a current switching and control device generally 30 (see FIG. 3).

The device 30 which supplies positive and negative full wave unfiltered DC having a peak voltages of 25 volts at 1.5 amps from a 115 volt AC 60 Hz. source has circuitry shown schematically in FIG. 3 and consists of three sections: a DC supply section generally A, a timing and control circuit generally B, and an output switching circuit generally C. Circuit components, shown symbolically, are identified as follows: D for diodes, C for capacitors, R for resistors, Q for transistors.

As illustrated a transformer 33 having a centre tap shown as Vo, supplies, through diodes D1, D2, D3, and D4, positive and negative full wave unfiltered DC (positive voltage to line 34 negative voltage to line 35) having peak voltages of 25 volts with respect to the transformer centre tap. Diode D5 and capacitor C1 provide filtered 25 volt DC for operation of the timing circuit B and isolate the timing circuit from voltage variations.

The timing circuit consists of a bistable mult-vibrator provided with transistors Q1 and Q2 triggered by a unijuction transistor Q3. Transistor Q3, resistor R9 and capacitor C4 form a relaxation oscillator, period of oscillation of which is determined by values of resistor R9 and capacitor C4 to between 11 and 20 seconds. Since this circuit times both output polarities each is of equal duration.

The timing circuit controls, through the resistor R10, ON-OFF condition of the transistor Q4 which is a voltage level translator and converts 0–25 voltage level swing of the timing circuit to negative 25 and positive 25 voltage level swing of the output switching circuit.

During a one-half cycle of the timing circuit transistor Q4 is turned ON by current flowing through resistor R10 and during the other half of the cycle transistor Q4 is OFF.

When transistor Q4 is ON the voltage at the top of Q4 is essentially negative supply voltage —V and this voltage appears at bases of transistors Q5 and Q6. Q5 is an NPN transistor with its emitter connected to —V (lead 35) and will, conequently, be in an OFF condition. Junction of resistors R14 and R16 will also be at —V. Transistor Q6, on the other hand, is a PNP transistor with its emitter connected to +V through resistors R15 and R17 and is conducting. Transistors Q5 and Q6 are bias drivers for two output transistors pairs Q7, Q8 and Q9, Q10. Q7, Q8 are connected in a Darlington configuration and act as a single high gain PNP transistor whereas transistors Q9 and Q10, also connected in a Darlington configuration, act as an NPN transistor. The NPN transistor (Q9, Q10) has its emitter connected to —V through resistor R19 and its base is at —V through resistors R14 and R16 so that it is in an OFF condition and does not conduct.

Transistor Q6, however, being a PNP transistor with its emitter connected to +V through resistors R15 and R17 is conducting. The voltage at the junction of resistor R15 and resistor R17 is a few volts below full positive volts, the difference being set by values of resistors R15 and R17, this difference being termed V bias.

V bias is applied to the base of the PNP Darlington (Q7 and Q8) causing current to flow to output pole 28 from +V through resistor R18 and transistor Q8, thence through the external load and back to the transformer centre tap. Below a certain limit the amount of current flowing depends on the value of +V and the resistance of the external load. If the resistance of the external load is sufficiently low the current flow will be sufficient to cause a voltage drop across resistor R18 to approach V bias at which point transistor Q8 will appear as a variable resistance in series with the external load so as to maintain current at a constant value—this determined by the values of V bias and resistor R18.

During the other half of the cycle, that is when transistor Q4 is OFF, the voltage appearing at bases of transistors Q5 and Q6 is +V. The PNP transistor (Q7 and Q8) is also OFF and V bias is applied to the base of transistor Q9 through resistors R14 and R16 causing transistor Q10 to conduct and supply current at —V to pole 28.

Temperature sensitive resistors R21 and R22 connected across the resistors R17 and R16 and thermally coupled to the transistors Q8 and Q10 change the resistance of the latter and the value of V bias if transistors Q8 and Q10 begin to overheat thus decreasing output current and limiting temperature rise of transistors Q8 and Q10.

Resistor R13 is a safety device to limit current to the base of transistor Q5.

A centre-zero ammeter 36 between the pole 27 and the transformer centre tap is used to indicate magnitude and polarity of the current.

OPERATION

In use of the apparatus 10 to treat water in a swimming pool the casing 11 can be connected in a circulation line with which most pools are equipped, the polarity changing device 30 being connected to a 115 v. 60 Hz. power source. The apparatus can operate without further attention other than an occasional check on the ammeter to ensure that current value is relatively constant at 1.80 amps.

In installations such as swimming pools where water is, in fact, stored for a considerable length of time residual effect of the oligodynamically active metals emitted into the water from the apparatus 10 is at a maximum.

In household water supply installations, however, for instance where water is pumped directly from a well to household taps, most effective use of the apparatus is obtained by the installation of a storage facility in a water line downstream of the apparatus 10 so as to obtain maximum benefit of the residual effects of the oligodynamic active metals emitted into the water.

In order to ascertain bactericidal and algaecidal effectiveness of apparatus 10 tests were conducted as follows:

Test No. 1.—The apparatus 10 was connected to receive municipal sewage from an outlet channel of a sedimentation basin; half the sewage was passed through the apparatus 10 and half out of a sample cock ahead of the sedimentation basin. Apparatus 10 connected to 115 v. 60 Hz. power supply. Area of one square foot and flow therethrough was measured at 2.8 liters per minute.

Sampling of discharge from the apparatus 10 and the sampling cock was done simultaneously. Results of two sets of sample taken twenty minutes apart are shown in Table A following:

TABLE A

| | Time (hour) S=Sampled A=Analyzed | Total coliform count (per 100 ml.) | Reduction, percent [1] |
|---|---|---|---|
| Raw Number 1 | S=1410 A=1430 | 3,400,000 | |
| Treated | S=1410 A=1415 | 500,000 | 85 |
| Do | A=1510 | 290,000 | 91 |
| Do | A=1555 | 78,000 | 97 |
| Raw Number 2 | S=1430 A=1520 | 3,200,000 | |
| Treated | S=1430 A=1455 | 400,000 | 87 |
| Do | A=1550 | 250,000 | 92 |

[1] Reduction calculated by: $(1 - \frac{Treated}{Raw}) \times 100$

The tests indicate immediate effect of treatment. In sample set No. 1 an eighty-five percent reduction in coliform count was obtained five minutes after treatment and in sample set No. 2 an eighty-seven percent reduction was obtained twenty-five minutes after treatment.

The tests also indicate the high residual effect of the presence of the oligodynamic metals in the sewage—a ninety-seven percent reduction in coliform count being obtained one hour and forty-five minutes after treatment.

Test No. 2.—In order to ascertain algaecidal effectiveness of the apparatus tests were carried out on a 25,000 gallon pool filled with tap-water. The apparatus 10 powered from a 115 v. 60 Hz. power source was connected into a water circulation line and san filter with which the pool was equipped and water circulated for five months—July to November. Water containing algae and algae spores was injected from time to time into the pool. However, during the months of July and August in which daytime temperatures vary in a mid seventy degree range no algae growth was observed.

In September additional water heavily loaded with algae together with a commercial fertilizer, to foster algae growth, was added to the pool. No algae growth was observed.

From October on the pool water was badly abused. Urine, waste water and other pollutants were mixed into the pool water and a quantity of septic tank effluent was also added. No algae growth was observed and in a final bacterial analysis made in November no bacterial or virus forms were found. Tests taken in November also determined that concentrations of copper and silver in the pool water were below established maximum permissible levels.

On termination of the test the apparatus was disassembled and it was observed that the electrode plates were only slightly consumed—despite high acidity of the swimming pool water which was at one time lowered by the addition of acid to a pH of 5.4. This indicated that with a water at pH of 6.8 to 6.9 (normally recommended for swimming pools) the apparatus could operate effectively and continuously for a number of years without replacement of electrode plates—original thickness of which was one-eighth inch.

It is to be understood that although the appartaus 10 is particularly effective for sterilizing drinking water and water in swimming pools its use is not so limited. It can be used for sterilizing liquids such as fruit juices, milk, and like liquids for human consumption. Furthermore, results of tests in Table A indicate effectiveness of the operation in treatment of municipal sewage to reduce bacterial and virus forms.

We claim:
1. Apparatus for oligodynamic sterilization of liquids including:
 (a) electrodes formed of a copper and silver alloy in which the ratio of copper to silver is twenty to one, and adapted to be immersed in spaced apart relationship in a liquid to be treated,
 (b) means for connecting the electrodes as opposite poles in an electric circuit,
 (c) means for alternating polarity of the electrodes at predetermined intervals.

2. Apparatus as claimed in claim 1 wherein the means (c) includes:
 (i) means for providing a source of DC electric power,
 (ii) a PNP transistor pair for controlilng current flow from a positive voltage side of the power source to one electrode,
 (iii) an NPN transistor pair for controlling current flow from a negative voltage side of the power source to said electrode,
 (iv) transistor means including a relaxation oscillator and bias drivers for varying, at said intervals, voltage polarity at the bases of the transistor pair so as to alternate, at said intervals, conductivity of said transistor pairs between OFF and ON conditions so that polarity of said one electrode is altered at said intervals.

3. Apparatus for oligodynamic sterilization of liquids including:
 (a) a dielectric casing having a long cylindrical chamber through which liquid to be treated is passed,
 (b) a pair of conductors extending longitudinally of and through the chamber and adapted to be connected to a source of electric power, the conductors being disposed in diametrically opposed relationship,
 (c) a plurality of electrode plates each formed of an alloy of copper and silver in which the ratio of copper to silver is twenty to one connected to each of the conductors, the plates being disposed so that each plate of one conductor extends in spaced relationship between a pair of adjacent plates of the other conductor,
 (d) the plates having a slidable fit in the chamber and each having a peripheral indentation to permit the passage of liquids, the indentations being disposed in staggered relationship on opposite sides of the chamber so that the liquid, on passing through the chamber, follows a zig-zag course,
 (e) means for altering the polarity of the electrode plates at intervals of between eleven and twenty seconds.

4. Apparatus as claimed in claim 3 wherein the means (e) includes:
 (i) means for providing a source of DC electric power,
 (ii) a PNP transistor pair for controlling current flow from a positive voltage side of the power source to one conductor, (iii) an NPN transistor pair for controlling current flow from a negative voltage side of the power source to said one conductor, (iv) transistor means including a relaxation oscillator and bias drivers for varying, at said intervals, voltage polarity at the bases of the transistor pairs so as to alternate, at said intervals, conductivity of said transistor pairs between OFF and ON conditions so that polarity of said one electrode plates of said one conductor at said intervals.

References Cited

FOREIGN PATENTS

| 274,909 | 1929 | Great Britain | 204—137 G |
| 384,466 | 1932 | Great Britain | 204—137 G |

JOHN H. MACK, Primary Examiner

N. A. KAPLAN, Assistant Examiner

U.S. Cl. X.R.

204—137, 293